(12) United States Patent
Lu

(10) Patent No.: US 7,437,583 B2
(45) Date of Patent: Oct. 14, 2008

(54) METHOD AND SYSTEM FOR FLEXIBLE CLOCK GATING CONTROL

(75) Inventor: Paul Lu, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 409 days.

(21) Appl. No.: 10/932,251

(22) Filed: Sep. 1, 2004

(65) Prior Publication Data

US 2005/0273640 A1    Dec. 8, 2005

Related U.S. Application Data

(60) Provisional application No. 60/577,005, filed on Jun. 4, 2004.

(51) Int. Cl.
*G06F 1/32* (2006.01)

(52) U.S. Cl. .................................... 713/322

(58) Field of Classification Search ............... 713/322, 713/300
See application file for complete search history.

(56) References Cited

U.S. PATENT DOCUMENTS 6,920,572 B2 *   7/2005   Nguyen et al. ............... 713/322
6,938,176 B1 *   8/2005   Alben et al. ................. 713/323
6,971,038 B2 *  11/2005   Santhanam et al. ......... 713/324
7,290,158 B2 *  10/2007   Shikata ....................... 713/400

* cited by examiner

*Primary Examiner*—Rehana Perveen
*Assistant Examiner*—Eric Chang
(74) *Attorney, Agent, or Firm*—McAndrews, Held & Malloy, Ltd.

(57) ABSTRACT

Distributing clock signals within an electronic device may comprise determining a status of at least one gate that controls flow of a clock signal to at least one device coupled to the gate. One or more of the gates may be controlled based on this determined status and it may be determined whether the devices coupled to the gate are active or inactive. One or more gates that control the flow of the clock signal to the device may be turned OFF if the device is inactive. The status of one or more of the gates may be read from one or more registers mapped to the gates. One or more gates that control one or more active devices may be prevented from being deactivated based on the determined status of the gates. A current hardware setting of a gate may be overridden via software control.

26 Claims, 4 Drawing Sheets

METHOD AND SYSTEM FOR FLEXIBLE CLOCK GATING CONTROL

CROSS-REFERENCE TO RELATED APPLICATIONS/INCORPORATION BY REFERENCE

This application makes reference to, claims priority to and claims the benefit of U.S. Provisional Application No. 60/577,005, filed on Jun. 4, 2004.

The above referenced application is hereby incorporated herein by reference in its entirety.

FIELD OF THE INVENTION

Certain embodiments of the invention relate to clock signals for electronic circuits. More specifically, certain embodiments of the invention relate to a method and system for flexible clock gating control.

BACKGROUND OF THE INVENTION

Mobile communication devices such as cellular telephones, personal digital assistants (PDAs), and handheld devices are now required to perform more sophisticated communication functions, as well as time management functions. Although some of these communication functions and time management function have been tightly integrated into single chip solutions such as a system-on-chip (SoC), thereby resulting in significantly reduced form factors, power consumption requirements still remain a cause for concern. In general, the greater the number of transistors or devices with transistors that are utilized within an integrated circuit (IC), the greater the number of amount of power or electrical energy that is consumed. Although a large amount of electrical power or energy is consumed by transistors within an integrated circuit (IC), an even larger amount of power is consumed by the wires that route clock signals, because clock signals are constantly switching. Therefore extensive clock gating is often used to confine the wires that load the clock network.

FIG. 1 is a block diagram of a conventional integrated circuit design illustrating a clock tree. Referring to FIG. 1, there is shown a phase lock loop (PLL) 102, gate control block 134, devices D1, D2, D3, D4, D5, D6, D7 referenced as 104, 106, 108, 110, 112, 114, 136 respectively, and gates $G_1$, $G_2$, $G_3$, $G_4$, $G_5$, $G_6$, $G_7$, $G_8$, $G_9$ referenced as 116, 118, 120, 122, 124, 126, 128, 130, 132, respectively.

In operation, the gate control block 134 controls gates ($G_1$-$G_9$) 116, 118, 120, 122, 124, 126, 128, 130, 132. If the gate $G_1$ 116 is ON, then a clock signal generated by the PLL 102 passes to gates $G_2$ 118, $G_6$ 126 and $G_9$ 132. In this regard, gate $G_1$ 116 may be regarded as the main gate. While gate $G_1$ 116 is ON, gate $G_2$ 118 is ON, then the clock signal generated by the PLL 102 passes to gates $G_3$ 124, $G_4$ 122, and $G_5$ 124. If gate $G_3$ 120 is ON, then the clock signal passes to device D1 104. If gate $G_4$ 122 is ON, then the clock signal passes to device D2 106. If gate $G_5$ 124 is ON, then the clock signal passes to device D3 104. If any of gates $G_3$ 120, $G_4$ 122 and $G_5$ 124 is OFF, then the device coupled to the corresponding gate will not receive the clock signal generated by PLL 102. For example, if gate $G_4$ 122 is off then device D2 106 will not receive the clock signal generated by PLL 102.

If the gate $G_1$ 116 is ON and gate $G_6$ 126 is ON, then the clock signal generated by the PLL 102 passes to gates $G_7$ 128 and $G_8$ 130. If gate $G_7$ 128 is ON, then the clock signal passes to device D4 110. If gate $G_8$ 130 is ON, then the clock signal passes to device D5 112. If any of gates $G_7$ 128, and $G_8$ 130 is OFF, then the device coupled to the corresponding gate will not receive the clock signal generated by PLL 102. For example, if gate $G_8$ 130 is off then device D5 112 will not receive the clock signal generated by PLL 102.

A major drawback with the conventional clock tree illustrated in FIG. 1 is that the gate control block 134 and gates $G_1$-$G_9$ 116-132 are configured when the integrated circuit is fabricated and a customer, based on a specific circuit design, does not have the flexibility to disable or enable certain clocks when the customer has application scenarios that are not covered in the design phase. A device, which is never utilized in the customer application can still receive clock signals from the PLL 102, consumes precious and limited power resources. For example, if gates $G_1$ and $G_2$ are both ON, then the clock signal generated by the PLL 102 passes to gates $G_3$, $G_4$ and $G_5$. However, there may be instances where gate $G_4$ is ON and device D2 106 is consuming power even thought it is never in use in the customer application. In another example, if gates $G_1$ and $G_6$ are both ON, then the clock signal generated by the PLL 102 passes to gates $G_7$ and $G_8$. However, there may be instances where gate $G_8$ should be ON at situations different from what configured in the gate control block 134 because the customer uses device D5 112 in a way different from what the integrated circuit designer anticipated.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for distributing clock signals within an electronic device. The method may comprise determining a status of at least one gate that controls flow of a clock signal to at least one device coupled to the gate. One or more of the gates may be controlled based on this determined status. A determination may be made as to whether one or more of the devices coupled to the gate is active or inactive. One or more gates that control the flow of the clock signal to the device may be turned OFF if it is determined that the device is inactive. The status of one or more of the gates may be read from one or more registers that are mapped to the gates. One or more gates that control one or more active devices may be prevented from being deactivated based on the determined status of the gates. A current status of one or more gates that control flow of the clock signal may be changed, for example, by asserting or de-asserting one or more register locations. A current hardware setting of one or more of the gates that control flow of the clock signal may be overridden by changing a register setting.

Another embodiment of the invention may provide a machine-readable storage, having stored thereon, a computer program having at least one code section executable by a machine, thereby causing the machine to perform the steps as described above for distributing clock signals within an electronic device.

The system for distributing clock signals within an electronic device may comprise at least one processor that determines a status of at least one gate that controls flow of a clock signal to at least one device coupled to the at least one gate. The processor may be adapted to control one or more gates based on the determined status and may determine whether one or more devices coupled to one or more of the gates may be active or inactive. If it is determined that a device is inactive, the processor may be configured to turn OFF one or more gates that control the flow of the clock signal to the device. The status of one or more gates may be read from one or more registers by the processor. The processor may prevent one or more gates that controls one or more active devices from being deactivated based on the determined status of the gates. The processor may change a current status of one or more gates that controls flow of the clock signal by asserting or de-asserting at least one register location mapped to one or more gates that control flow of the clock signal. The processor may override a current hardware setting of one or more gates that control flow of the clock signal.

Another embodiment of the invention provides a system for distributing clock signals within an electronic device. The system may comprise a clock tree having a plurality of gates and a hardware control logic block coupled to the clock tree that controls at least a portion of the gates. A processor, under control of the clock tree driver, may be adapted to control at least one register, which may be utilized to overwrite a status of at least some of the gates that are controlled by the hardware control block. Under control of the clock tree driver, the processor may be adapted to assert or de-assert a current value of one or more registers.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention provide a method and system for distributing clock signals within an electronic device. Distributing clock signals within an electronic device may comprise determining a status of at least one gate that controls flow of a clock signal to at least one device coupled to the gate. One or more of the gates may be controlled based on this determined status and it may be determined whether the devices coupled to the gate are active or inactive. One or more gates that control the flow of the clock signal to the device may be turned OFF if the device is inactive. The status of one or more of the gates may be read from one or more registers mapped to the gates. One or more gates that control one or more active devices may be prevented from being deactivated based on the determined status of the gates. A current hardware setting of a gate may be overridden via software control.

Figure 1:
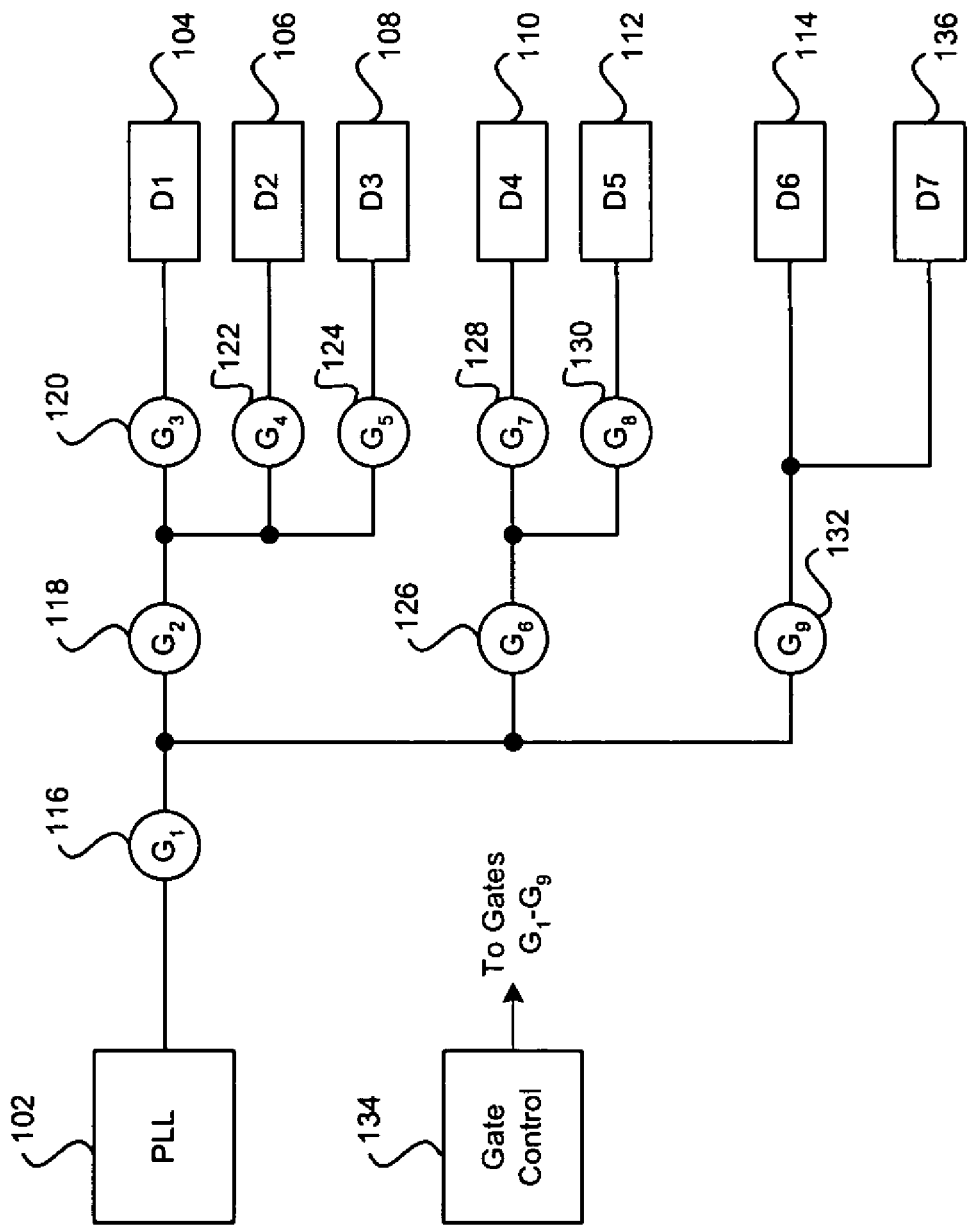
FIG. 1 is a block diagram of a conventional integrated circuit design illustrating a clock tree.
Figure 2A:
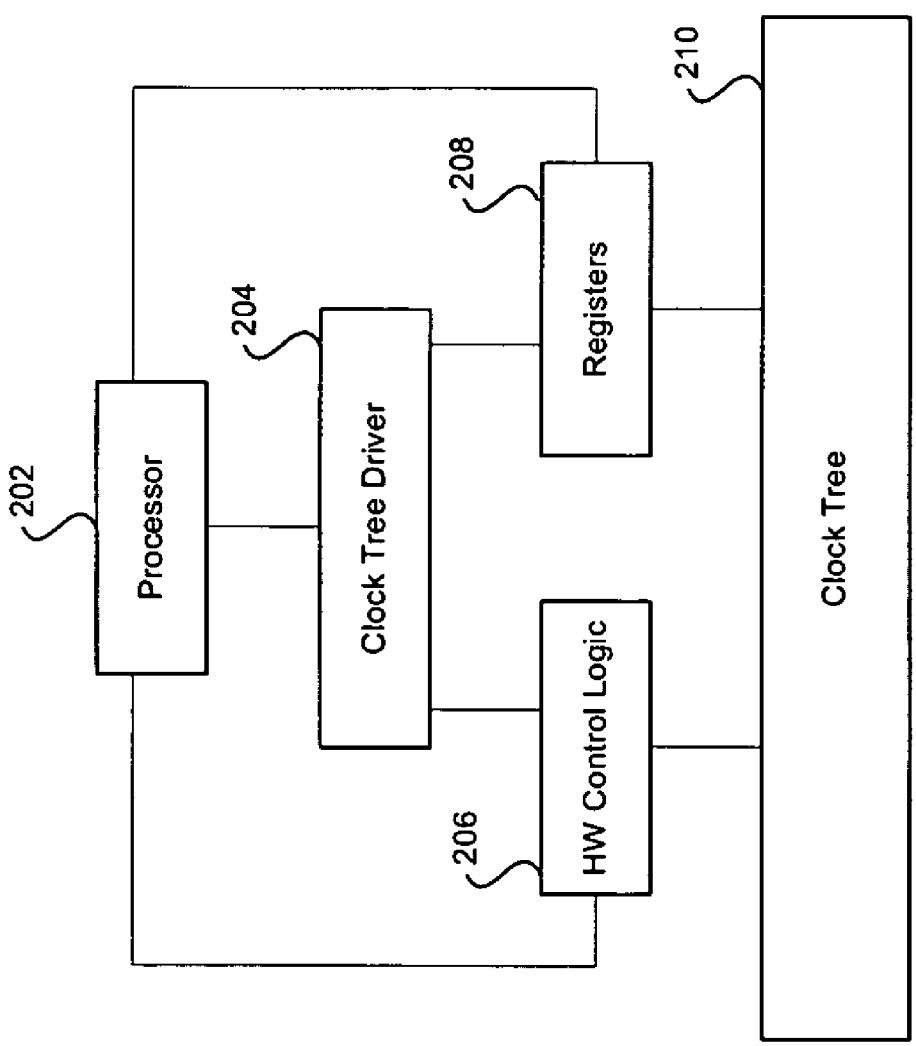
FIG. 2a is a high-level block diagram of an exemplary system for flexibly controlling a clock tree, in accordance with an embodiment of the invention.

FIG. 2a is a high-level block diagram of an exemplary system for flexibly controlling a clock tree, in accordance with an embodiment of the invention. Referring to FIG. 2a, there is shown a processor 202, a clock tree driver block 204, a hardware control logic block 206, a register block 208, and a clock tree block 210.

The processor 202 may be an on-chip or off-chip processor that may be adapted to execute code for the clock tree driver block 204, which may be utilized to control the operation of gates within the clock tree block 210.

The clock tree driver block 204 may comprise suitable logic and/or code that may be adapted to determine and/or change a status of the gates in the clock tree 210. The clock tree driver block 204 may also be adapted to determine whether a device coupled to a gate may be active or inactive. Accordingly, the clock tree driver block 204 may be adapted to read one or more register locations in the register block 208 in order to determine a status of a gate and/or a device coupled to a gate. The clock tree driver block 204 may also be adapted to set one or more register locations in the register block 208 in order to activate and/or deactivate one or more gates in the clock tree 210.

The hardware control logic block 206 may comprise suitable logic circuitry and/or code that may be adapted to control the operation of gates within the clock tree 210. The hardware control logic block 206 may also be adapted to control operation of the devices that may be coupled to the gates. In this regard, the hardware control block and/or the clock tree driver block 204 may be utilized to determine whether a device is active and/or inactive. In an aspect of the invention, the system status may also be utilized to let hardware implicitly determine whether a gate is ON or OFF.

The register block 208 may comprise a plurality of registers that may be adapted to control and provide status of the gates within the clock tree 210. In accordance with an embodiment of the invention, one or more register locations of the register block 208 may be mapped to a gate. In an aspect of the invention, registers may also be utilized to let software explicitly determine whether a gate is ON or OFF.

Figure 2B:
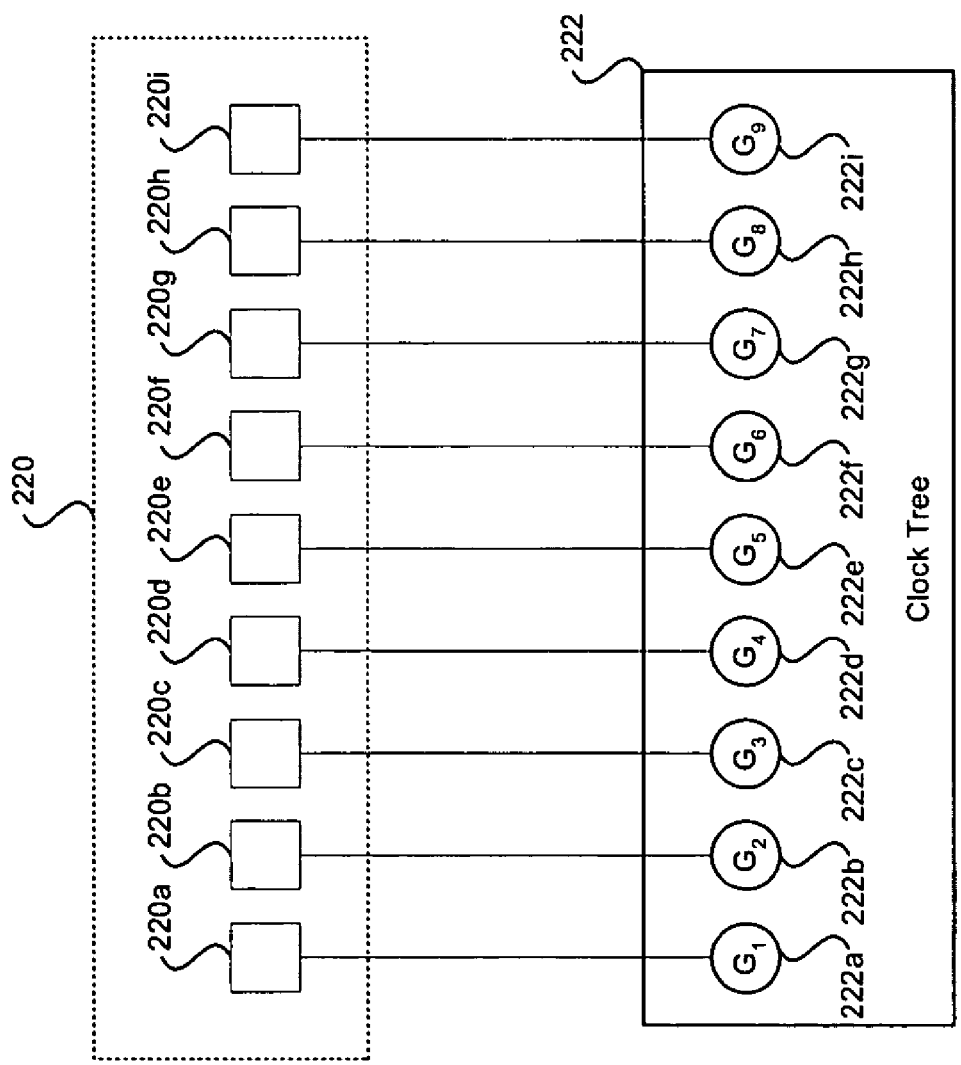
FIG. 2b is a block diagram illustrating an exemplary register mapping that may be utilized for controlling the gates in the clock tree of FIG. 2a, in accordance with an embodiment of the invention.

FIG. 2b is a block diagram illustrating an exemplary register mapping that may be utilized for controlling the gates in the clock tree of FIG. 2a, in accordance with an embodiment of the invention. Referring to FIG. 2b, there is shown a register block 220 and a clock tree block 222. The register block 220 comprises a plurality of register locations, namely register locations 220a, 220b, 220c, 220d, 220e, 220f, 220g, 220h and 220i. The clock tree block 222 comprises a plurality of gates $G_1$ 222a, $G_2$ 222b, $G_3$ 222c, $G_4$ 222d, $G_5$ 222e, $G_6$ 222f, $G_7$ 222g, $G_8$ 222h and $G_9$ 222i. The following table illustrates an exemplary mapping of the register locations 220a through 220i to the gates $G_1$ through $G_9$ 222a-222i. In this regard, if a bit in a particular register location is read and found to be asserted, then this may indicate that the corresponding gate may be turned ON. Similarly, if a bit in that particular register location is read and found to be de-asserted, then this may indicate the corresponding gate may be turned OFF. To turn off a gate that is ON, the corresponding register location may be de-asserted by writing an appropriate logic value that causes de-assertion. Similarly, to turn ON a gate that is off, the corresponding register location may be asserted by writing an appropriate logic value that causes assertion.

Figure 3:
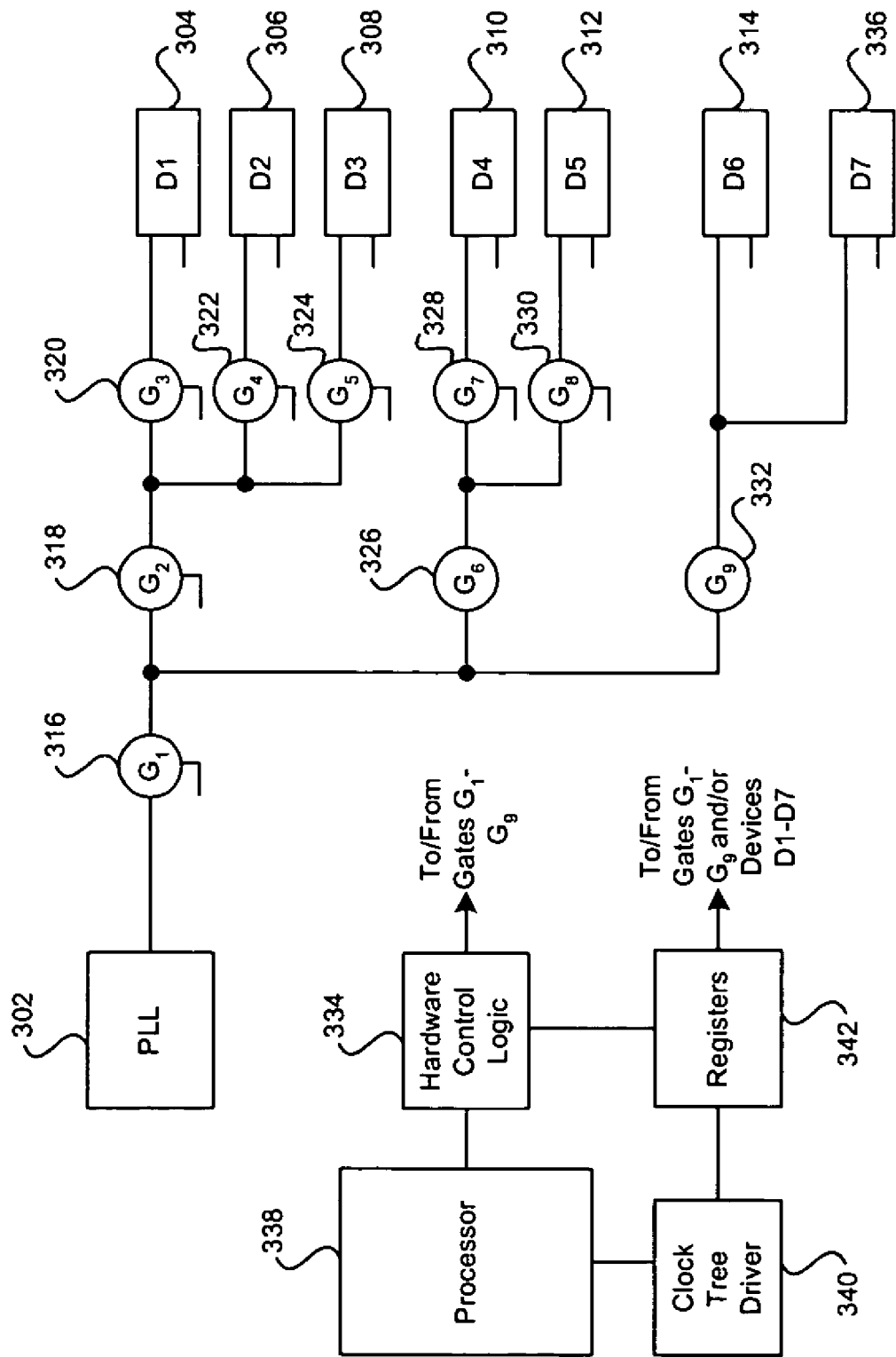
FIG. 3 is a block diagram of an exemplary system that may be utilized to flexibly control a clock tree, in accordance with an embodiment of the invention.

Returning to FIG. 2a, the clock tree block 210 may comprise a plurality of gates that may be controlled by the hardware control logic block 210 and/or the clock tree driver block via the register block 208. FIG. 3 is a block diagram of an exemplary system that may be utilized to flexibly control a clock tree, in accordance with an embodiment of the invention. Referring to FIG. 3, there is shown phase lock loop (PLL) 302, devices D1, D2, D3, D4, D5, D6, D7 referenced as 304, 306, 308, 310, 312, 314, 336 respectively, and gates $G_1$, $G_2$, $G_3$, $G_4$, $G_5$, $G_6$, $G_7$, $G_8$, $G_9$ referenced as 316, 318, 320, 322, 324, 326, 328, 330, 332, respectively. FIG. 3 further comprises processor 338, clock tree driver block 340, hardware control logic block 334, and register block 342.

In operation, the hardware control logic block 334 may be utilized to turn the gates $G_1$-$G_9$ ON or OFF. However, under control of the processor via the clock tree driver 340 and the register block 342, the gates $G_1$-$G_9$ may be more flexibly controlled in order to cover scenarios that were not anticipated when hardware control logic 334 was designed. In this regard, in instances where the hardware control logic block 334 may have a gate turned ON and that gate is supplying a clock signal to a device that is not being utilized, then the processor may intercede by turning OFF the gate that is supplying the clock signal to the device. In other instances where the hardware control logic block 334 may have a gate turned OFF and that gate is supplying a clock signal to a device that the customer wants to utilize in that situation, then the processor may intercede by turning ON the gate that is supplying the clock signal to the device.

In an aspect of the invention, the processor 338 and hardware control logic block 334 may determine whether a gate is turned ON and supplying a clock signal to a device that is not actively being used. If it is determined that the device is not being actively utilized, then the processor may determine whether a branch in the clock tree may be totally deactivated or partially deactivated. For example, if it is determined that device D6 314 is active and device D7 336 is inactive, then the processor may determine whether gate $G_9$ may be turned OFF while allowing the clock signal to be supplied to the active device D6 314. In this case, since device D6 314 and device D7 336 are both directly coupled to gate $G_9$, then gate $G_9$ may not be turned OFF, while at the same time, supplying a clock signal to the active device D6 314. As a result, the processor 338 and clock tree driver 340 will take no action.

However, consider a case where it is determined that device D4 310 is active and device D5 312 is inactive. In this case, the processor may determine whether gate $G_8$ may be turned OFF while allowing the clock signal to be supplied to the active device D4 310. In this case, since the active device D4 310 and the inactive device D5 312 are both independently coupled to gate $G_6$ via gates $G_7$ and $G_8$ respectively, and then gate $G_8$ may be turned OFF, while at the same time, supplying a clock signal to the active device D4 314 via gates $G_1$, $G_6$ and $G_7$. As a result, the processor 338 and clock tree driver block 340 may turn OFF gate $G_8$. In order to turn OFF gate $G_8$, the processor 338 and clock tree driver block 340 may de-assert the corresponding register locations that are mapped to the gate $G_8$.

Consider a case where it is determined that devices D1 304 and D2 306 are active and device D3 308 is inactive. In this case, the processor may determine whether gate $G_5$ may be turned OFF while allowing the clock signal to be supplied to the active devices D1 304 and D2 306. In this case, since the active devices D1 304 and D2 306 and the inactive device D3 308 are independently coupled to gate $G_2$ via gates $G_3$, $G_4$, and $G_5$ respectively, then gate $G_5$ may be turned OFF, while at the same time supplying a clock signal to the active devices D1 304 and D2 306 via gates $G_1$, $G_2$ $G_3$, and $G_4$. As a result, the processor 338 and clock tree driver block 340 may turn OFF gate $G_5$. In order to turn OFF gate $G_5$, the processor 338 and clock tree driver block 340 may de-assert the corresponding register locations that are mapped to the gate $G_5$.

In a scenario where all of devices D1 304, D2 306 and D3 308 are inactive, then the processor 338 and clock tree driver block 340 may de-assert the mapped register locations corresponding to gates $G_3$, $G_4$ and $G_5$. Additionally, since gates $G_3$, $G_4$ and $G_5$ are coupled to gate $G_2$, which are all coupled on an independent branch, then the register location corresponding to gate $G_2$ may also be de-asserted. In a somewhat similar manner, if devices D4 310 and D5 312 are inactive, then the corresponding register locations that are mapped to gates $G_6$, $G_7$ and $G_8$ may be de-asserted.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for distributing clock signals within an electronic device, the method comprising:
   determining a status of at least one gate that controls flow of a clock signal to at least one device coupled to said at least one gate; and
   controlling said at least one gate based on said determined status.

2. The method according to claim 1, comprising determining whether said at least one device coupled to said at least one gate is active or inactive.

3. The method according to claim 1, comprising turning OFF said at least one gate that controls said flow of said clock signal to said at least one device if said at least one device is inactive.

4. The method according to claim 1, comprising reading said status from at least a portion of at least one register.

5. The method according to claim 1, comprising preventing at least one gate controlling at least one active device from being deactivated based on said determined status of said at least one gate.

6. The method according to claim 1, comprising changing a current status of said at least one gate that controls flow of said clock signal.

7. The method according to claim 1, comprising asserting or de-asserting at least one register location of said at least one gate that controls flow of said clock signal.

8. The method according to claim 1, comprising overriding a current hardware setting of said at least one gate that controls flow of said clock signal.

9. A machine-readable storage having stored thereon, a computer program having at least one code section for distributing clock signals within an electronic device, the at least one code section being executable by a machine for causing the machine to perform steps comprising:
  determining a status of at least one gate that controls flow of a clock signal to at least one device coupled to said at least one gate; and
  controlling said at least one gate based on said determined status.

10. The machine-readable storage according to claim 9, comprising code for determining whether said at least one device coupled to said at least one gate is active or inactive.

11. The machine-readable storage according to claim 9, comprising code for turning OFF said at least one gate that controls said flow of said clock signal to said at least one device if said at least one device is inactive.

12. The machine-readable storage according to claim 9, comprising code for reading said status from at least a portion of at least one register.

13. The machine-readable storage according to claim 9, comprising code for preventing at least one gate controlling at least one active device from being deactivated based on said determined status of said at least one gate.

14. The machine-readable storage according to claim 9, comprising code for changing a current status of said at least one gate that controls flow of said clock signal.

15. The machine-readable storage according to claim 9, comprising code for asserting or de-asserting at least one register location of said at least one gate that controls flow of said clock signal.

16. The machine-readable storage according to claim 9, comprising code for overriding a current hardware setting of said at least one gate that controls flow of said clock signal.

17. A system for distributing clock signals within an electronic device, the system comprising:
  at least one processor that determines a status of at least one gate that controls flow of a clock signal to at least one device coupled to said at least one gate; and
  said at least one processor controls said at least one gate based on said determined status.

18. The system according to claim 17, wherein said at least one processor determines whether said at least one device coupled to said at least one gate is active or inactive.

19. The system according to claim 17, wherein said at least one processor turns OFF said at least one gate that controls said flow of said clock signal to said at least one device if said at least one device is inactive.

20. The system according to claim 17, wherein said at least one processor reads said status from at least a portion of at least one register.

21. The system according to claim 17, wherein said at least one processor prevents at least one gate controlling at least one active device from being deactivated based on said determined status of said at least one gate.

22. The system according to claim 17, wherein said at least one processor changes a current status of said at least one gate that controls flow of said clock signal.

23. The system according to claim 17, wherein said at least one processor asserts or de-asserts at least one register location of said at least one gate that controls flow of said clock signal.

24. The system according to claim 17, wherein said at least one processor overrides a current hardware setting of said at least one gate that controls flow of said clock signal.

25. A system for distributing clock signals within an electronic device, the system comprising:
  a clock tree having a plurality of gates;
  a hardware control logic block coupled to said clock tree that controls at least a portion of said plurality of gates;
  at least one register that is controlled by a clock tree driver; and
  at least one processor that overwrites a status of at least a portion of said plurality of gates which is controlled by said hardware control logic block.

26. The system according to claim 25, wherein said processor via said clock tree driver asserts or de-asserts a current value of said at least one register.

* * * * *